United States Patent [19]
Furusawa et al.

[11] 4,091,679
[45] May 30, 1978

[54] VIBRATING QUARTZ ACCELEROMETER

[75] Inventors: Kaoru Furusawa, Kawasaki; Sumiyuki Ishigami, Yokohama, both of Japan

[73] Assignees: Meisei Electric Co., Ltd.; Tokyo Denpa Company Ltd., both of Tokyo, Japan

[21] Appl. No.: 717,136

[22] Filed: Aug. 24, 1976

[51] Int. Cl.² .............................................. G01P 15/10
[52] U.S. Cl. ................... 73/497; 73/517 AV; 73/DIG. 1
[58] Field of Search ........... 73/517 AV, DIG. 1, 497; 310/8.4, 8.1, 25

[56] References Cited
U.S. PATENT DOCUMENTS

| 2,854,581 | 9/1958 | Scarrott | 73/517 AV |
| 2,984,111 | 5/1961 | Kritz | 73/517 AV |
| 3,190,129 | 6/1965 | Kritz et al. | 73/517 AV |
| 3,692,128 | 9/1972 | Gallo | 73/DIG. 1 |

Primary Examiner—James J. Gill
Attorney, Agent, or Firm—Toren, McGeady and Stanger

[57] ABSTRACT

A vibrating quartz accelerometer of moving object under test, wherein both ends of at least two vibrating quartz resonators are rigidly coupled each other so as to confront their faces each other and to form gap between said resonators, one end of which is made as a fixed end to said moving object and another end thereof is made as a free end to said moving object, a weight is provided on said free end, and when said moving object is put into motion, inertia force, which acts on said weight in the direction for keeping original state of motion or state of standstill relative to said motion, is converted into beat frequency in resonant frequency of said two vibrating quartz resonators, which beat frequency is caught to detect acceleration of said moving object.

13 Claims, 6 Drawing Figures

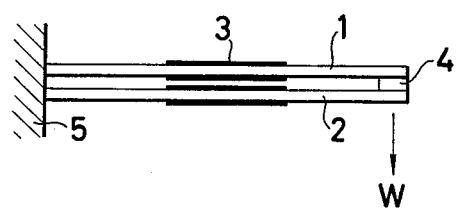
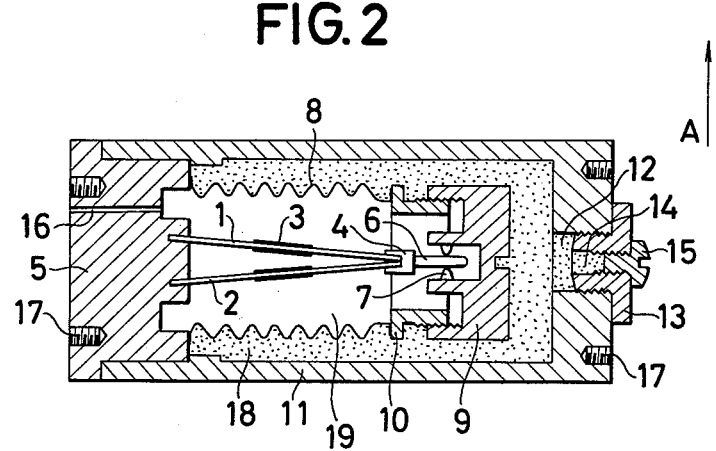

VIBRATING QUARTZ ACCELEROMETER

FIELD OF THE INVENTION

This invention relates to a vibrating quartz accelerometer by means of vibrating quartz resonators.

BACKGROUND OF THE INVENTION

When any force is given from outside to the vibrating quartz resonators, resonant frequency of said vibrating quartz resonators will be changed. In this invention, a vibrating quartz accelerometer is obtained by utilizing this principle, which will be firstly explained with reference to the attached drawings, particularly FIG. 1.

BRIEF EXPLANATION OF THE DRAWINGS

FIG. 1 is an explanatory drawing of detecting operation according to this invention.

FIG. 2 is central longitudinal section of an embodiment of this invention.

FIG. 1 shows the structural principles of a part of vibrating quartz resonators used in embodiments of this invention. Here, a first plate shaped vibrating quartz resonator 1, and a second vibrating quartz resonator 2, both including electrodes 3 for connecting an electric circuit. A holder distance piece separates the resonators 1 and 2 at one end, while they are mounted on base plate 5 at the other end. The reference character W represents a weight.

Figure 3:
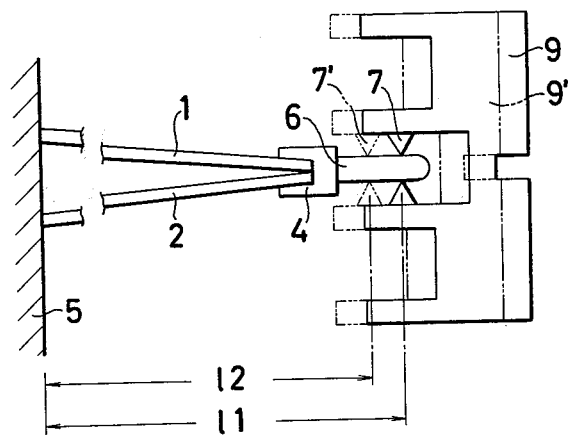
FIG. 3 is an explanatory drawing of temperature correcting operation of the embodiment.

The first vibrating quartz resonator 1 and the second vibrating quartz resonator 2 are arranged opposite each other and rigidly joined together at one end thereof with the mounting base plate 5 and at another end thereof with the distance piece 4, thus being formed as a fixed end relative to the weight W on the side of mounting base plate 5 and formed as a free end relative to the weight W on the side of distance piece 4.

In general, electric resonant frequency (frequency of electric natural vibration, hereinafter referred to electric resonant frequency, except otherwise specified) of a vibrating quartz resonator having vibration figure in the direction of thickness changes in proportion to the stress caused by a weight (or amount of displacement by the stress on the vibrating quartz resonator by the stress) irrespective of the kind of stress due to load, and this relation may be formularized as follows.

$$\frac{\Delta f}{F} = \frac{f}{2C_{ij}}\left(\frac{dC_{ij}}{dF}\right) \quad (1)$$

$$f = \frac{1}{2t}\sqrt{\frac{C_{ij}}{\rho}} \quad (2)$$

where, $f$ is resonant frequency, $\Delta f$ is the amount of change of resonant frequency, $F$ is stress caused on the vibrating quartz resonator due to exerted force, $C_{ij}$ is elastic constant of the vibrating quartz resonator, $t$ is thickness of the vibrating quartz resonator and $\rho$ is density of the vibrating quartz resonator.

And, the displacement of free end of oppositely arranged two diaphragms due to load W will be as follows when sought from the equation for curve of a cantilever.

$$v = \frac{4Wl^3}{Eb\{(\Delta h + 2t)^3 - \Delta h^3\}} \quad (3)$$

where, $v$ is displacement of the tip of cantilever, $W$ is load, $l$ is length of the long side (horizontal line) of the vibrating quartz resonator, $b$ is length of the short side (non-horizontal line) of the vibrating quartz resonator, $\Delta h$ is opposing distance between two vibrating quartz resonators, $t$ is thickness of the vibrating quartz resonator and $E$ is Young's modulus.

Now, it is known that the stress F varies in proportion to the product of displacement and amount of displacement. From this knowledge and the equations (1) and (3), one may derive that the displacement of the tip of a vibrating quartz resonator is in proportion to both of changes of load W and resonant frequency of vibrating quartz resonator.

Figure 4:
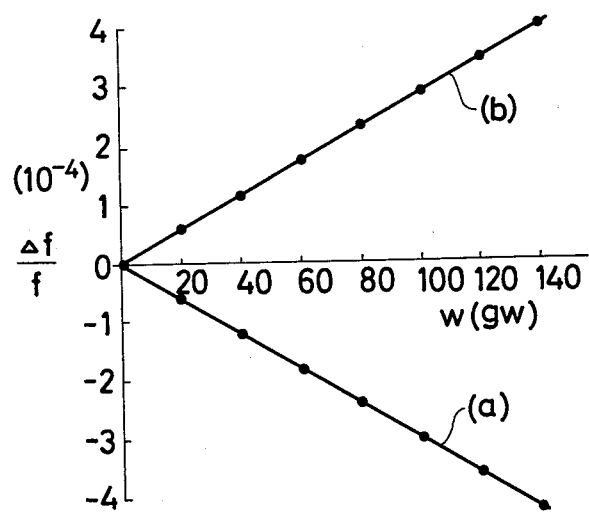
FIG. 4 is a diagram showing characteristics of load vs. change rate of resonant frequency.

FIG. 4 is a graph showing the result of measurement about two opposite vibrating quartz resonators shown in FIG. 1. In this graph, (a) denotes characteristics shown by the first vibrating quartz resonator and (b) denotes characteristics shown by the second vibrating quartz resonator. Each of the first and second plate shaped vibrating quartz resonators uses an element having the same frequency change rate $\Delta f/f$ characteristic with respect to the stress (load W).

The characteristics (a) and (b) illustrate that the absolute values of the frequency change rate $\Delta f/f$ are equal and opposite in direction. This is attributable to the fact that a tensile force acts on the first vibrating quartz resonator and compressive force acts on the second vibrating quartz resonator and yet the absolute values of said tensile force and said compressive force are equal within a range in which the displacement of the tip is not large.

SUMMARY OF THE INVENTION

The present invention provides a vibrating quartz accelerometer using vibrating quartz resonators, wherein plural vibrating quartz resonators are arranged opposite each other, one end thereof is fixed and another end thereof is made free, a weight is attached to the free end, which weight is given a large moment of inertia against acceleration to be detected, thus when any acceleration is exerted thereon, the displacement of said weight is sensed by the deviation of resonant frequency of the plural vibrating quartz resonators to detect said exerted acceleration.

DETAILED DESCRIPTION OF THE INVENTION

This invention relates to a vibrating quartz accelerometer obtained by skillful utilization of above mentioned principle, of which embodiment will be explained with reference to FIG. 2, FIG. 3, FIG. 5 and FIG. 6 as below.

And, in the embodiment, plate-shaped quartz vibrator (hereinafter referred to quartz vibrating plate) is used as vibrating quartz resonator.

FIG. 2 is a central longitudinal section of the embodiment of this invention, wherein reference numeral 1 denotes the first quartz vibrating plate, 2 the second quartz vibrating plate, 3 electrodes for connecting an electric circuit, 4 a combining member, 5 the base block, 6 a pin member, 7 a pair of fulcrum members, 8 bellows, 9 a weight, 10 a slidable member, 11 a casing, 12 a regulating hole, 13 a block screw for the regulating hole, 14 a filling hole for the damping medium, 15 a block screw for the filling hole, 16 a filling hole for inert gas, 17 a fitting screw hole, 18 the first space defined by casing 11, a bellows 8, a weight 9, etc. and 19 the second space within bellows 8.

The fixed end of the first quartz vibrating plate 1 and the second quartz vibrating plate 2 which are arranged with their largest faces opposing to each other, are inlaid in the base block 5. The free ends thereof are rigidly fixed together by the combining member 4.

The weight 9 has a screw mechanism and the weight 9 and said slidable member 10 screwed to each other. The weight 9 is formed in such a manner that when it is turned by a screw-driver it will slide along the direction of a horizontal line between the two quartz vibrating plates 1 and 2 through said slidable member 10. The combination of the weight 9 and the two quartz vibrating plates 1 and 2 is attained by slidable abutment between the fulcrum members 7 provided on the weight 9 and the cylindrical pin member 6 fixedly provided on the combining member 4.

The bellows 8 is secured to the base block 5 and the slidable member 10. The second space 19 is defined by the base block 10, the bellows 8, the slidable member 10 and the weight 9.

In the casing 11, there are provided with a regulating hole 12, in which said weight 9 is slided along the direction of two quartz vibrating plates 1 and 2 to regulate the position of weight 9, and screw holes 17 for fitting the acceleration detector of this embodiment to an object to be measured, and in the base block 5, there are provided a filling hole 16 for filling inert gas such as dry nitrogen into the second space within the bellows 8 and screw holes 17 for fitting the acceleration detector to the object to be measured, thus these casing 11 and base block 5 envelop therein two quartz vibrating plates 1 and 2 which are enclosed by the bellows 8 to be closely combined so as to make the interior airtight.

After the position of weight 9 is regulated through the regulating hole 12, this hole is blocked by the block screw 13. A filling hole 14 is provided on this block screw 13 for filling damping medium therein, and through said filling hole 14, viscous substance such as silicon oil is filled up as damping medium in the first space 18, then said filling hole 14 is blocked by the block screw 15.

And, the filling hole 16 provided in the base block 5 is blocked by, for instance, filling medium of synthetic resin system, after inert gas is filled up in the second space 19 within the bellows 8.

The reason why the weight 9 is provided with slidable mechanism to make the weight 9 slidable along the direction of horizontal line of the quartz vibrating plate is to correct errors of force-frequency sensitivity and mechanical resonant frequency by changing the position of fulcrums where forces are exerted, which errors might be caused among products on forces given to the two quartz vibrating plates 1 and 2 by the same acceleration due to dispersion on their production, resulting in some differences of resonant frequency about individual product. Namely, when the displacement of weight 9 due to a force is converted into the bending of two quartz vibrating plates 1 and 2, magnitude of the bending may be changed by shifting the positions of fulcrum members 7, thus tensile force and compressive force acting on the first quartz vibrating plate 1 and the second vibrating plate 2 may be regulated.

The damping medium filled up in the first space 18 will restrain mechanical vibration of the weight 9, preventing the damage of quartz vibrating plate due to mechanical resonance as well as normally indicating detected value.

Now, let $m$ be mass of the weight, $k$ spring constant of the quartz vibrating plate, and R viscous resistance due to damping medium, equation of motion about the quartz vibrating plate of cantilever type will be as follows.

$$\frac{dx^2}{dt^2} + \frac{R}{m} \cdot \frac{dx}{dt} + \frac{k}{m} x = \frac{A}{m} \cos \omega t \tag{4}$$

where, $\omega$ is angular frequency of mechanical vibration of moving system including quartz vibrating plate, $t$ is time, and A is a constant.

By solving the equation (4), it is given $$x = ae^{-\alpha t} \cos(\sqrt{\omega_o^2 - K^2} \, t + P) + \frac{A}{m\sqrt{5K^2 \omega^2 + (\omega_o^2 - \omega^2)^2}} \cos(\omega t + \phi) \tag{5}$$

where, $K = \frac{R}{2m} \cdot \frac{k}{m} \omega_1^2$,

P is initial velocity, $a$ is a constant (representing the initial amplitude of vibration), $x$ is the positional changes, in terms of distance, of a vibrating point, and $\omega_o = \sqrt{\omega_1^2 - K^2}$.

$\omega_o$ and $\omega_1$ respectively shows angular frequency of mechanical vibration of moving system including quartz vibrating plate when $R \neq 0$ and $R = 0$.

In the equation (5), term in question about damping medium is the second term, in which let B be the part expressing amplitude and let $$\frac{\omega}{\omega_o} = \Omega, r = \frac{R}{2\omega_o m}, \text{ so we get} \tag{6}$$

$$\frac{B}{A} m \omega_o^2 = \frac{1}{\sqrt{4r^2 \Omega^2 + (1 - \Omega^2)^2}}$$

Figure 6:
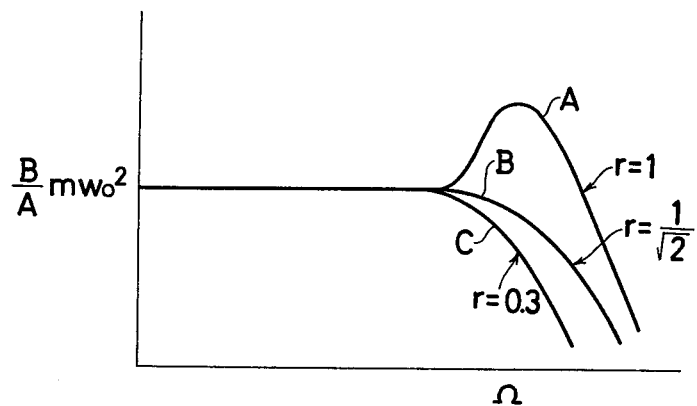
FIG. 6 is a diagram showing mechanical vibration characteristics of moving system.

About the equation (6), when the relation between $\Omega$ and $(B/A)m\, \omega_o^2$ is expressed on a graph, it is shown as in FIG. 6.

The optimum value of viscous resistance R is obtained at the time of characteristics shown by B in FIG. 6, and in the embodiment, when $r = 1/\sqrt{2}$, we get $$R = 14.2 \times 10^{-2} \sim 14.7 \times 10^{-2} \text{(dyne·sec/cm)}$$

And, viscous resistance R is determined, by shape and dimension of the weight, namely $$R = C\xi$$

where, C is a constant determined by shape and dimension of the weight, and $\xi$ is coefficient of kinematic viscosity.

In the embodiment, it was found that it is proper to take = 120 centi-stoke (1/100 dyne·sec/cm², normally shorten as CS to be its unit) for the value of said R.

The coefficient of kinetic viscosity is "1" for water, so that the coefficient of kinetic viscosity concerned with this invention will be 120 times of that of water.

By the way, the coefficient of kinetic viscosity of 120 CS is a value which may be easily attained by using silicon oil on the market.

And, as damping medium, besides liquid material such as said silicon oil, powdered material may be used, and generally any material having damping effect is available. The reason why inert gas being filled up in the second space within the bellows 8 is the same reason as usually used in general that by locating quartz vibrating plates in the atmosphere of inert gas, it is intended to reduce aging, to prevent oxidation of electrode 3, and the like, thus to improve reliability of the plates.

And, the reason why the bellows 8 is used to enable the weight 9 to shift along the direction of horizontal line of two quartz vibrating plates 1 and 2 is, besides the consideration for thermal expansion of damping medium mentioned below, to attain antidetonation effect, by absorbing the increment of volume due to thermal expansion of said damping medium.

Now, when an object to be measured travels with certain acceleration in the direction of arrow A, the vibrating quartz accelerometer will move with the same acceleration in the direction of arrow A. At this time, the weight 9 is subjected to such force that it will remain at its original position due to its inertia, and this force acts as equally as that load is exerted in opposite direction to the arrow A on two quartz vibrating plates 1 and 2. The first and second vibrating quartz resonators 1 and 2 are bent, because the free end fixed together move in a direction contrary to the direction of A. In consequence, tensile force acts on the first quartz vibrating plate 1 and compressive force acts on the second quartz vibrating plate, and respective resonant frequency will change in proportion to the magnitude of acceleration to change respective resonant frequency as shown by (a) and (b) in FIG. 4.

In this embodiment, since the acceleration is made to be caught by the beat frequency after mixing between the first and the second quartz vibrating plates 1 and 2, the acceleration will be caught by about two times of variation of resonant frequency of one quartz vibrating plate.

Acceleration and force acting on the quartz vibrating plate due to the acceleration are proportional, and force acting on the quartz vibrating plate and resonant frequency thereof are in proportional relation, so that it is easy to convert the variation of resonant frequency into the magnitude of acceleration.

In the next place, change of characteristics of quartz plate due to temperature change will be explained.

Due to the change of ambient temperature, the base block 5 and the combining member 4 will be applied forces to cause stress in the first quartz vibrating plate and the second quartz vibrating plate, so that even though the temperature characteristics of quartz vibrating plates themselves are good, their resonant frequency will change. However, since the changes of resonant frequency of the first and the second quartz vibrating plates are substantially equal (the changes of resonant frequency of two quartz vibrating plates 1 and 2 are perfectly equal under an ideal state, wherein the combination between the base plate 5 and combining member 4 and the two quartz vibrating plates 1 and 2 is made perfectly equal), and the variation is caught by the beat frequency after mixing such as the embodiment of this invention, the change of resonant frequency due to said temperature change will be cancelled each other, so that a good accelerometer may be obtained.

Figure 5:
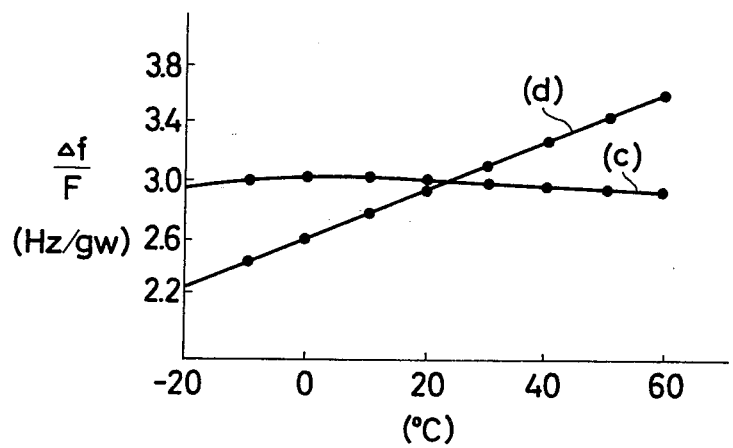
FIG. 5 is a diagram showing characteristics of change of frequency for temperature dependence.

By the way, the quartz vibrating plate, for instance, so-called AT-cut, of which a singly rotated AT-cut $(r \times l) + 35°15'$, has itself a good resonant frequency vs. temperature characteristics, however, change of stress vs. resonant frequency, i.e. a force sensitivity, has temperature dependence. Curve (d) in FIG. 5 shows its example, wherein the variation of resonant frequency vs. temperature dependence changes in a straight line relative to temperature change.

To eliminate error of measurement due to temperature dependence of this force sensitivity, thermal expansion of damping medium is positively utilized in this invention.

In FIG. 2, when damping medium filled up in the first space 18 increase its volume due to temperature rise, the weight 9 will shift along the direction of the quartz vibrating plates 1 and 2, of which state of things is shown in FIG. 3.

In FIG. 3, the weight 9 in full line shows the state before shifting and the weight 9' in dotted line shows the state after shifting.

As the weight 9 shifts, the fulcrum member 7 slides on the pin member 6 to shift to the position 7'. So that, the distance from the base block 5 to the fulcrum will change from $l1$ to $l2$ due to temperature rise. Namely, for the same force given to the fulcrum (i.e. the force given to the fulcrum by the shifting of the weight 9 due to acceleration), tensile force and compressive force respectively given to the two vibrating quartz resonators 1 and 2 will become smaller due to temperature rise. Accordingly, rate of change of resonant frequency (absolute value) will become smaller in a straight line as is apparent from FIG. 4. On the contrary, since the change of resonant frequency to temperature dependence of the quartz vibrating plate itself will increase in a straight line due to temperature rise as shown by (d) in FIG. 5, the change of resonant frequency due to the shift of said fulcrum and the change of resonant frequency to temperature dependence of said quartz vibrating plate are cancelled each other, thus a vibrating quartz accelerometer having less temperature dependence.

The volume of the first space 18 is determined in consideration of the coefficient of thermal expansion of damping medium to be used and the change of resonant frequency vs. temperature characteristic (temperature dependence) of the vibrating quartz resonators. Namely, the volume of said first space 18 (volume of damping medium) is determined in such a manner that the change of resonant frequency due to the shift of fulcrum member 7 to the weight 9 caused by the change of volume of damping medium according to temperature change and the change of resonant frequency of the quartz vibrating plate itself due to temperature change, will cancel each other.

Straight line (c) in FIG. 5 shows temperature dependence of the force sensitivity of the embodiment, showing good characteristics in wide range ($-20°$ to $+60°$ C) of temperature change.

The vibrating quartz accelerometer according to this invention is incorporated in a part of an electric oscillation circuit in such a manner that the quartz resonator serves as a part of an element for determining the frequency of the electric oscillation to detect the acceleration on the basis of the change in the output oscillation frequency of the circuit.

Recently, minimizing of electronic circuit means has made progress, and for instance, when a transmitter with integrated circuit is prepared within a vibrating quartz accelerometer, such as within the second space 19 in the embodiment, it is able to obtain a vibrating quartz accelerometer which is small-sized and may be easily used and yet may dynamically catch the motion of an object at a fixed point.

As is apparent from the foregoing in detail, according to this invention the detecting element is made to catch acceleration by the beat frequency of two opposite vibrating quartz resonators, so that even though the vibrating quartz resonant is subjected to displacement at its supporting portion (for instance, the portion inlaid in the base block 5 mounting structures) due to temperature change, the measuring error due to its variation will be cancelled each other, thus a detector having good temperature characteristics may be obtained. And, by adopting slide mechanism of bellows and fulcrum, antidetonation structure may be obtained, as well as by positive use of thermal expansion of damping medium to make the stress given to the vibrating quartz resonators variable, the change of resonant frequency vs. temperature characteristic (temperature dependence) for unit stress, when the vibrating quartz resonators are subjected to stress, is improved, thus a vibrating quartz accelerometer independent of temperature change is obtained.

Further, the shift of fulcrum is made possible even manually and mechanism is adopted which may correct the change of resonant frequency to the acceleration of vibrating quartz resonators, and since damping medium is enclosed, the damage of vibrating quartz resonators due to mechanical resonance of moving system is prevented and normal acceleration detected in a short time may be indicated.

This invention has such a lot of advantages mentioned above, taking very large effect.

What is claimed is:

1. A vibrating quartz accelerometer for a moving object, comprising: two plane-shaped quartz resonators each having two ends and two plane surfaces, both ends of the resonators being rigidly coupled to each other so as to cause their surfaces to confront each other and so as to form a gap between the surfaces, one pair of coupled ends being fixed to the moving object and the other pair being free to move relative to the object, a weight, coupling means for coupling the free ends of the resonators and the weight to each other, so that when said moving object is placed in motion the inertial force which acts on the weight in a direction that maintains the original state of motion or standstill may be converted into a beat frequency, the resonant frequencies of said two quartz resonators which beat frequency may be sensed to detect acceleration of the moving object, a bellows which is expansible and contractible along the direction of the horizontal line of the vibrating quartz resonators, is formed to have said resonators therein and is provided between the fixed end of said resonators and the weight, said coupling means forming coupling points between said weight and said vibrating quartz resonators, the points being shiftable along the direction of expansion and compression of said bellows, said weight and bellows being surrounded by damping material, and the position of the coupling points being shiftable by volume changes due to temperature changes of said damping material so as to correct the temperature dependence of the force sensitivity of said vibrating quartz resonators.

2. A vibrating quartz accelerometer for a moving object, comprising: two plane-shaped quartz resonators each having two ends and two plane surfaces, both of the resonators being coupled to each other so that two surfaces confront each other and form a gap between the surfaces, one pair of coupled ends being fixed to the moving object and the other pair being free to move relative to the object, a weight, coupling means for coupling the weight to the ends free to move relative to the object, a bellows expansible and contractible along the direction of the plane surfaces of the resonators and formed to surround said resonators, said bellows extending between the fixed ends and the weight, said weight and said resonators forming coupling points between them, said coupling points being shiftable along the direction of expansion and contraction of said bellows, a fluid damping material surrounding said weight and said bellows: so that when said moving object is placed in motion the inertial force, which acts on the said weight in a direction to maintain the original motion or standstill, is converted into a beat frequency from the resonant frequency of said two quartz resonators so that said beat frequency may be sensed to detect the acceleration of the moving object.

3. An accelerometer comprising: a housing, a pair of plate-shaped piezoelectric resonators each having a pair of ends and a pair of surfaces, said resonators each having an electrode on each of said surfaces, a weight in the housing movable relative to the housing, said housing having an interior wall, said resonators each being cantilevered from the wall at one end and coupled to the weight at the other so as to move with the weight relative to the housing, one surface of one of said resonators opposing one surface of the other of said resonators, a fluid-tight bellows surrounding said resonators and forming with said weight and with said wall a space interior to the bellows separate from the space surrounding the bellows, a damping fluid in the space surrounding said bellows in said housing, coupling means for coupling said weight to the other ends of said resonators, said coupling means being shiftable with said weight relative to said resonators to provide plurality of different coupling distances from said wall so as to make it possible to vary the effective length of the lever arms formed by said weight with said resonators.

4. An accelerometer as in claim 3, wherein the one end of each of said resonators at the wall is embedded in the wall so as to cantilever the resonators from the wall.

5. An accelerometer as in claim 3, wherein the pair of said piezoelectric resonators is a pair of vibrating quartz resonators.

6. An accelerometer as in claim 3, wherein the damping fluid has a volume which varies with temperature and adjusts the bellows expansion and the weight relative to the wall in response to temperature so as to compensate for changes in temperature.

7. An accelerometer as in claim 3, wherein coupling means couple the weight to the other ends of said resonators, said coupling means being variable and coupling said weight to said resonators at one of a plurality of different coupling distances from said wall so as to make it possible to vary the lever arm formed by the weight with said resonators.

8. An accelerometer as in claim 7, wherein said weight includes two mutually threaded portions so that if one of the portions is rotated it moves the coupling points, one of said portions having a screwdriver slot for rotation thereof.

9. An accelerometer comprising: a housing, a pair of plate-shaped piezoelectric resonators each having a pair of ends and a pair of surfaces, said resonators each having an electrode on each of said surfaces, a weight in the housing movable relative to the housing, said housing having an interior wall, said resonators each being cantilevered from the wall at one end and coupled to the weight at the other so as to move with the weight relative to the wall, fluid-tight bellows surrounding said resonators and forming with the weight and the wall a space interior to the bellows separate from the space surrounding the bellows, a damping fluid in the space surrounding the bellows and within the housing.

10. An accelerometer as in claim 9, wherein the one end of each of said resonators at the wall is embedded in the wall so as to cantilever the resonators from the wall.

11. An accelerometer as in claim 9, wherein one surface of one piezoelectric resonator faces a surface on the other of said piezoelectric resonators.

12. An accelerometer as in claim 9, wherein coupling means couple the weight to the other ends of said resonators, said coupling means being shiftable and coupling said weight to said resonators at one of a plurality of different coupling distances from said wall so as to make it possible to vary the lever arm formed by the weight with said resonators.

13. An accelerometer as in claim 12, wherein said damping fluid has a volume which varies with temperature and adjusts the bellows expansion and the weight relative to the wall in response to temperature so as to compensate for changes in temperature.

* * * * *